Figure 1:
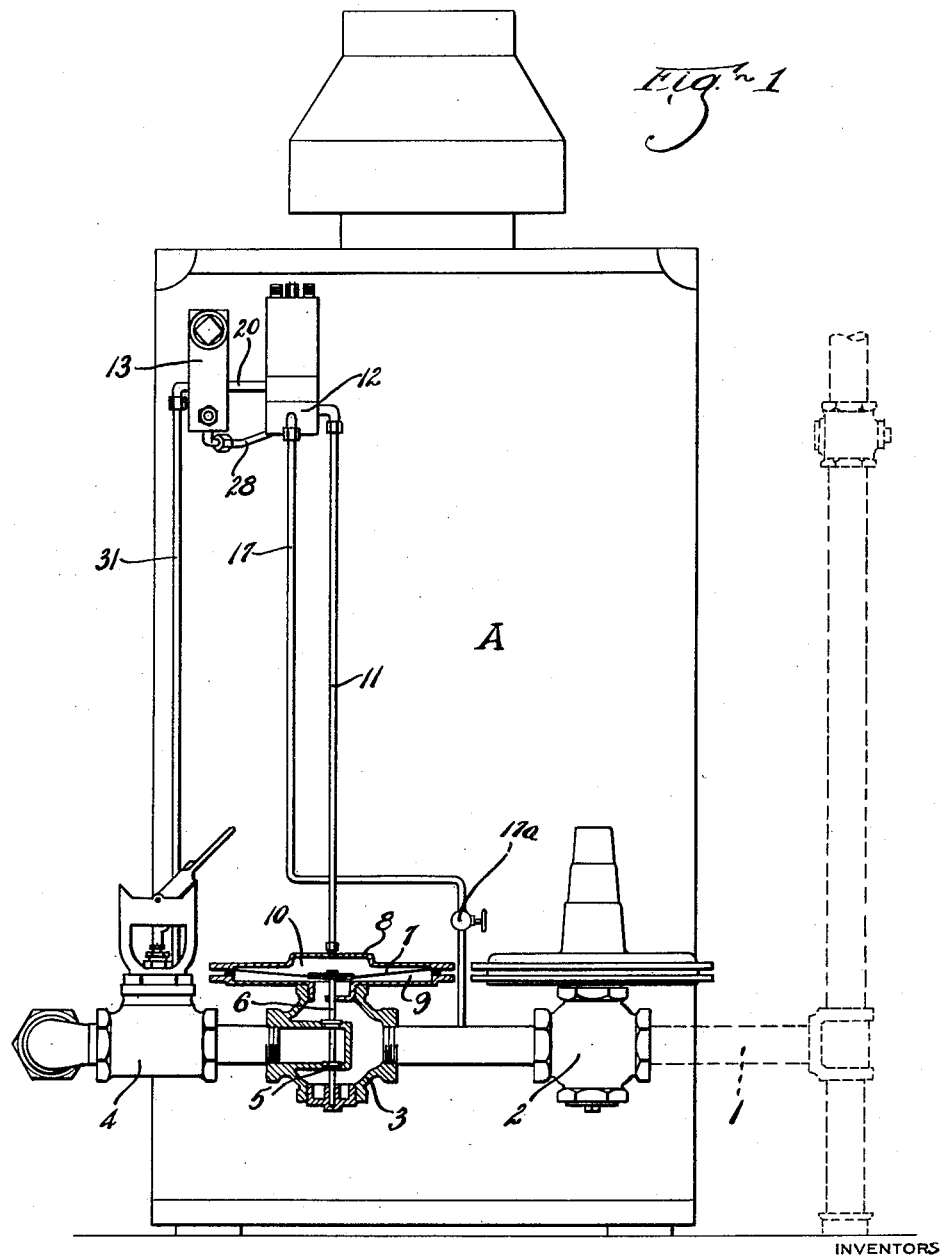

April 24, 1934.    G. B. SHAWN ET AL    1,956,136
SERVICE RESUMPTION MECHANISM
Filed Nov. 6, 1931    2 Sheets-Sheet 1

INVENTORS
GEORGE B. SHAWN
LEE E. BOVEE
BY Brackett, Hyde, Higley & Meyer
ATTORNEYS April 24, 1934.  G. B. SHAWN ET AL  1,956,136
SERVICE RESUMPTION MECHANISM
Filed Nov. 6, 1931  2 Sheets-Sheet 2
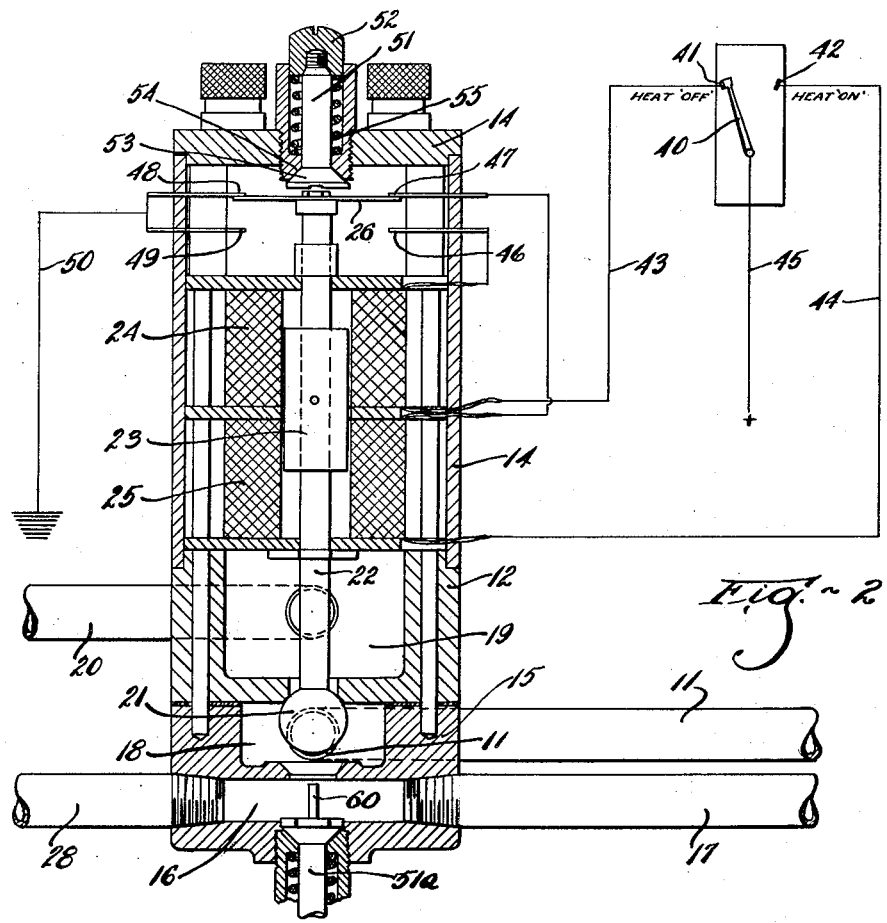
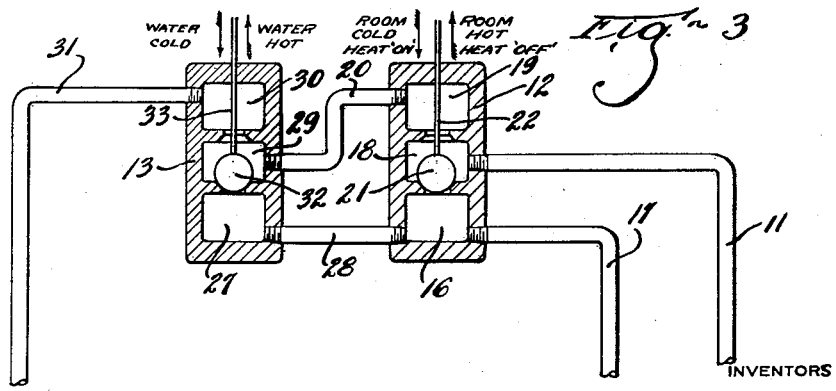
INVENTORS
GEORGE B. SHAWN
AND
LEE E. BOVEE
BY
Brockett, Hyde, Higley & Meyer
ATTORNEYS Patented Apr. 24, 1934

1,956,136

UNITED STATES PATENT OFFICE

1,956,136

SERVICE RESUMPTION MECHANISM

George B. Shawn, Cleveland Heights, Ohio, and Lee E. Bovee, Dormont, Pa., assignors, by mesne assignments, to General Electric Company, a corporation of New York Application November 6, 1931, Serial No. 573,390

3 Claims. (Cl. 236—85)

This invention relates to boiler control mechanism and particularly to what may be called service resumption mechanism therefor. Gas fired boilers are frequently controlled automatically by means of snap action valves of diaphragm or other type which in turn are controlled by electrical means, such as by electromagnets. In such systems it sometimes happens that when the room temperature is high, so that the snap action valve is in closed position, the current fails or some part of the electrical equipment gets out of order or the pilot valve sticks, so that when the room cools down and the electromagnetic or other device should move the pilot valve to "heat on" position, it fails to do so. To provide for such contingencies it has been customary to equip the snap action valve with a manually operated valve controlled gas supply from the main, by means of which pressure can be supplied to said snap action valve for causing it to open for the purpose of supplying heat to the house until the defect in the electrical circuit or operating mechanism is corrected. Such systems require that upon the resumption of current supply or correction of the electrical defect the manually operated valve referred to must be closed for the purpose of restoring the system to automatic control conditions.

The present invention has for its object to provide improved mechanism by which the pilot valve, at the will of the operator, may be moved to its "heat on" position under contingencies such as referred to, but which mechanism is of such character that upon the resumption of normal current conditions automatic control is automatically resumed without further attention by the operator, such system also doing away with the necessity for a hand controlled valve of the kind described.

A further object of the invention is to provide an improved electromagnetically operated valve mechanism, including a gas control valve, electromagnetic means for operating the same, and control switch mechanism, and embodying manually controlled means by which the said gas control valve may be actuated manually at the will of the operator independently of its automatic or electromagnetic control, and which mechanism is so arranged as to prevent dangerous escape of gas to the atmosphere under normal conditions.

Further objects of the invention are in part obvious and in part will appear more in detail hereinafter.

In the drawings, Fig. 1 is a side elevation showing a hot water heating boiler equipped with the invention, the snap action valve being shown in section; Fig. 2 is a sectional elevation, somewhat diagrammatic, illustrating the control or pilot valve, the electrical and manual operating mechanism therefor, and the electric circuits; and Fig. 3 is a sectional diagram of the associated control valves.

The improved gas burner control system illustrated in Figs. 1, 2 and 3, exclusive of the manual service resumption mechanism of the present invention, is the subject matter of a divisional application, Serial No. 717,544, filed March 27, 1934 by George B. Shawn.

In the arrangement shown in the drawings, A indicates a gas fired boiler, the burners of which (not shown) are supplied with gas coming from a supply main 1 through the usual pressure regulating valve 2, snap action valve 3, and hand cut-off valve 4. The snap action valve 3 is of common type, including the valve member 5 whose stem 6 is attached to and is operated by a diaphragm 7 in a casing 8, the lower chamber 9 of which is always in open communication with the pressure of the supply main 1, and the upper chamber 10 of which serves as a control chamber, being connected for that purpose to a pipe 11.

Said pipe communicates with suitable control mechanism, which in the form shown includes an electromagnetically operated pilot valve, generally indicated at 12, and a boiler controlling valve generally indicated at 13, the latter valve being actuated by any varying condition in the boiler ordinarily utilized for safety control thereof, such as by a device subject to water level, to steam pressure, to water temperature, or to any other one or more of the same or similar factors of boiler operation.

In the drawings, for simplicity of illustration, the boiler control valve 13 is shown as subject only to variations in water temperature because said boiler is designed for a hot water heating system.

The electromagnetically operated pilot valve 12 will first be described. It is shown diagrammatically in Fig. 3 and in detail in Fig. 2. Generally speaking, it is of the same type and operates in the same way as the valve operating device disclosed in a prior patent to Arthur F. Ericson, No. 1,439,231, granted December 19, 1922, to which reference may be had for a more complete description if necessary. This pilot valve includes a valve device, the necessary coils or electromagnetic elements for actuating the same, and a switch which forms a part of the control circuits for said coils and is operated for resetting purposes, as will appear. Referring to Fig. 2, this pilot valve mechanism in the present system includes a suitable casing 14 attached to a valve body 15, said casing and valve body being sealed against any escape or loss of gas to the atmosphere. The valve body includes three chambers, to wit, a lower chamber 16 communicating with the gas supply main 1 by a pipe 17 having a hand valve 17a so as to be supplied at all times when the hand valve is open with the full pressure of the supply, an intermediate chamber 18 communicating by way of the said pipe 11 with the upper control chamber of the snap action valve, and an upper chamber 19 communicating with a pipe 20 leading to an escapement outlet, as will appear. In the intermediate chamber 18 is a valve member 21 on a stem 22 and movable to either of two positions on lower and upper seats and adapted to control alternatively the connection of chamber 18 to either of the chambers 16, 19. The valve stem is extended in the hollow casing 14 where it carries a core 23 movable to and fro for valve actuation by energization by one or the other of two coils 24, 25, beyond which the stem is further extended to carry and actuate switch mechanism of the general type described and illustrated in the said Ericson patent. Such switch mechanism is here illustrated only conventionally. As shown, it comprises a switch member 26 carried by but insulated from the valve stem and serving as a bridge to control the flow of current to one or the other of the two coils 24, 25. The control circuits will be later described.

The boiler control valve 13 is more or less conventionally illustrated in Fig. 3. It also comprises three chambers, to wit, a chamber 27 communicating by the pipe 28 with the chamber 16 of the pilot valve, an intermediate chamber 29 communicating by way of the aforesaid pipe 20 with the upper chamber 19 of the pilot valve, and an upper chamber 30 communicating with the pipe 31 which leads to any suitable outlet, such as to an escapement burner (not shown), as is common in devices of this kind. In the intermediate chamber 29 is a valve 32 connected to a stem 33, the movement of which is controlled by a function of boiler operation such as steam pressure, water level, or the like. In the present instance, the boiler control valve is thermostatically operated by water temperature, so that the rod 33 is movable to and fro endwise with rise and fall of water temperature. It should be understood that as the water temperature rises the valve stem 33 moves upwardly, in the diagram Figure 3, as in the legends thereon, but in the actual assembly shown in Fig. 1 it moves horizontally.

Referring now to the electric circuits, these are of the usual three wire type, connecting the switch mechanism at the pilot valve 12 with the room temperature thermostat, which includes a thermostatically operated member 40 flexed back and forth, in response to variations in temperature, between the contacts 41, 42 in circuit with the wires 43, 44 respectively. Switch member 40 is connected to one side of the circuit, such as to positive, by wire 45. The wires 43, 44 are connected respectively through the coils 24, 25 to two contacts 46, 47 engaged alternately by the switch member 26 in its two positions, in which two positions it also engages contacts 48, 49 both connected by wire 50 to the other side of the circuit or to ground.

The control device forming the subject matter of the present invention is best illustrated in Fig. 2. It comprises any desirable means, capable of manual operation, by which the valve 21 may be manually actuated, the arrangement being such as to safeguard the apparatus against dangerous gas escape. The particular means shown for the purpose comprises an actuating rod 51 passing through the end wall 14a of the casing 14 and provided with a button 52 on its outer end for actuation by the fingers. On its inner end the rod is provided with a head 53 forming a valve member working on a seat 54, to which it is yieldingly held by a compression spring 55. The rod or stem 51 is axially alined with the valve rod 22 but its extreme inner end is spaced from the valve rod so that during normal operation of the valve parts the valve rod 22 moves back and forth without contacting the valve head 53, while said valve 53 under normal conditions prevents any possible escape of gas to the outside air. However, under emergency conditions, to be explained, the button 52 may be pressed to move the rod 51 inwardly until it contacts with the end of rod 22 and moves the same endwise, if such operation is desirable.

The operation is as follows:—

Fig. 3 shows the two valves 32 and 21 in their lowermost positions. Therefore, the water in the boiler is cold or at least at a normal or low temperature and the room temperature thermostat is demanding heat. In other words, valve 21 is in the "heat on" position. As a result, gas pressure flows from the supply main by way of pipe 17 to chamber 16 of valve 12 and to chamber 27 of valve 13, but it can go no farther because the valves 32 and 21 are closed. The upper chamber of the snap action valve 3 is open by way of pipe 11 to chamber 18, thence by way of the upper port to chamber 19, thence by way of pipe 20 to chamber 29, through the upper port in valve 13 to chamber 30 and thence by way of pipe 31 to the escapement burner. The pressure below the snap action valve diaphragm is greater than that above it, and the snap action valve is open so that gas flows to the burners and the furnace is producing heat.

When the room temperature rises to the proper point, the switch 40 is moved over to its appropriate contact (41 in this case), the upper coil 24 is energized, and the valve stem 22 and valve 21 are raised, switch 26 being also moved to its second position, resetting the three wire circuit ready for the reverse operation and energization of coil 25. In the new position of the parts, the connection of the snap action valve upper chamber 10 to the escapement outlet is cut off by the valve 21, which also now has opened communication between chambers 16 and 18 so that the pressure of the supply from pipe 17 flows to said upper chamber 10 of the snap action valve. Pressures on opposite sides of the diaphragm being equalized, the snap action valve closes and the furnace heat supply is shut off. When the room temperature goes down sufficiently, the switch 40 moves to its "heat on" position and the reverse action occurs. In other words, the normal action of the pilot valve 12 is to connect the upper chamber of the snap action valve either to the gas supply or to the escapement outlet, with the result of turning the furnace off or on.

At the same time, the boiler control valve mechanism, including the valve 32, is subject to variation in that factor of boiler operation which controls it, such as water temperature, and when the latter rises to the predetermined limit, according to the setting of the parts, valve 32 rises and wholly cuts off connection of the pilot and boiler control valves to the escapement burner by pipe 31 and under all circumstances causes flow of the main gas supply pressure to the upper chamber of the snap action valve, either by way of chambers 16, 18 and pipe 11 or by way of chamber 16, pipe 28, chamber 27, chamber 29, pipe 20, chamber 19, chamber 18 and pipe 11, compelling the snap action valve to close and cut off the heat.

If for any reason the current supply fails at a time when the pilot valve 21 is in its upper or "heat off" position, or if a part of the electrical equipment, such as a transformer supplying the leads 45, 50, or a part of the switch mechanism, fails when the pilot valve is in "heat off" position, or should said valve stick and fail to move upon an energization of the lower magnet 25, then the room temperature thermostat 40 would be demanding heat but the pilot control valve 21 would be in a position holding the snap action valve closed and no heat could be supplied. Under such emergency circumstances the operator goes down to the cellar and presses the button 52. Since the valve stem 22 is in its upper position, its upper end is engaged by the head 53 of the downwardly moving manual push button and the rod 22 is moved downward so that valve 21 is moved to its lower or "heat on" position, resulting in escape to the outlet of the pressure from the upper chamber of the snap action valve, permitting it to move to open position. Therefore, the furnace gas supply is turned on and the fire burns. Of course, if the emergency condition prevails for an extended period, either as the result of the current remaining turned off for a long time or of failure to repair a defect in the electrical equipment, the furnace will remain burning subject only to manual control thereof, such as by means of the hand valve 4, or of the individual valves (not shown) at the burners, and subject also to the usual safety control of the boiler, such as by the boiler control valve or other device 13, which will still act as before to cause the snap action valve to close when the temperature of the water rises too high.

However, when the faulty or defective condition of the electrical supply or equipment is remedied, for example by the current again coming on or by repair or replacement of the switch or transformer, as the case may be, the automatic control of the mechanism automatically resumes operation without further attention on the part of the operator. For example, if the contingency is the cutting off of the current supply for four or five hours, the button 52 is pressed to turn on the furnace, as described. The room temperature thermostat of course was in the "heat off" position at the time of actuation of button 52, but when the furnace is turned on the room temperature rises and the room temperature thermostat switch 40 moves to the "heat on" position, but without effect upon the pilot control mechanism due to the open circuit. However, when the current is turned on, the coil 24 is immediately energized, without attention by the operator, and the valve rod 22 moves to the "heat off" position and simultaneously resets the resetting switch.

The pilot valve mechanism so far described is equipped with a manually operated device for moving the pilot valve to its "heat on" position, but it is of course to be understood that it may be equipped with such a device or devices for moving it in either or both of the two directions of motion of the pilot valve. The drawings show one suitable arrangement for operating the pilot valve in both directions. Referring to Fig. 2, the device 51 at the upper end of the valve stem is utilized for moving the pilot valve downwardly to its lower seat or to "heat on" position. At the lower end of the valve stem is another operating device 51a similar in all respects to the device 51, but in this case equipped with a reduced extension 60, the upper end of which lies close to but does not contact with the valve 21 when in its lower position. With such an arrangement, should the pilot valve lie in the "heat on" position and for any reason fail to work automatically when called upon to do so, the operator can actuate this second manually operated emergency device and raise the valve 21 to its upper position, thereby turning off the heat, and if the current is resumed or the defect in the equipment is corrected, automatic control will be automatically resumed, without attention by the operator, as will be readily understood.

The arrangement described is quite simple, embodying a very simple modification in or in addition to the usual pilot control mechanism and voids the use of a special pressure control pipe for the snap action control chamber and the manual valve for operating it, and automatically resumes automatic control of the system upon the resumption of normal conditions, but independently of and without attention by the operator.

What we claim is:

1. Control mechanism for gas fired heating devices, comprising a gas supply pipe having a control valve, pilot valve mechanism for the control valve, including a pilot valve, thermostatically controlled electrically operated means for actuating it, circuits therefor including a resetting switch also actuated by said electrically operated means, and manually operable means effective upon said pilot valve for operating the same at the will of the operator independently of said electrically operated means, said pilot valve, electrically operated means and resetting switch being enclosed in a casing open to the gas supply, and said manually operable means being free of connection to the pilot valve and extending therefrom to the outside of said casing and being provided with means for normally preventing gas escape from said casing.

2. Apparatus of the class described, comprising a chambered body, a pilot valve therein, a hollow casing connected to said body and having a chamber communicating with the chamber of the valve body, the pilot valve having a stem extending into said casing and freely reciprocatable in either direction therein, a coil and a switch associated with the valve stem extension, and manually operable means for actuating said valve stem, said means comprising a valve member lying within the casing and closely spaced from but free of connection to the end of said valve stem, said valve member being yieldingly urged outwardly away from the said stem and seating outwardly and at one end having an operating member extending to the outside of the casing.

3. Apparatus of the class described, comprising a valve body, a pilot valve therein, a hollow casing connected to said body and having a chamber communicating with the valve body, the pilot valve having a stem extending into said chamber, a coil and a resetting switch lying in said chamber and associated with the valve stem extension, and manually operable means for actuating said valve stem, said means extending from said chamber to the outside of said casing and being provided with valve means for normally preventing escape of gas from said chamber.

GEORGE B. SHAWN.
LEE E. BOVEE.